United States Patent [19]
Tirpak et al.

[11] Patent Number: 5,212,230
[45] Date of Patent: May 18, 1993

[54] AQUEOUS POLYUREA DISPERSIONS PREPARED BY AN EMULSION POLYMERIZATION PROCESS

[75] Inventors: Robin E. Tirpak, Wheeling, W. Va.; Peter H. Markusch, McMurray, Pa.; Ashok M. Sarpeshkar, New Martinsville, W. Va.

[73] Assignee: Miles Inc., Pittsburgh, Pa.

[21] Appl. No.: 677,011

[22] Filed: Mar. 28, 1991

[51] Int. Cl.$^5$ .......................... C08J 3/00; C08K 3/20; C08L 75/00; C08G 18/00

[52] U.S. Cl. .................................. 524/589; 524/591; 524/839; 528/44; 528/60; 528/61; 528/65; 528/68

[58] Field of Search ............ 524/591, 839, 589; 528/44, 60, 61, 65, 68

[56]  References Cited
U.S. PATENT DOCUMENTS

| | | | |
|---|---|---|---|
| 3,479,310 | 11/1969 | Dieterich et al. | 260/29.2 |
| 3,663,472 | 5/1972 | Raymond | 524/591 |
| 4,066,591 | 1/1978 | Scriven et al. | 260/29.2 TN |
| 4,408,008 | 10/1983 | Markusch | 524/591 |
| 4,745,151 | 5/1988 | Noll et al. | 524/591 |

*Primary Examiner*—Paul R. Michl
*Assistant Examiner*—Patrick Niland
*Attorney, Agent, or Firm*—Joseph C. Gil; Thomas W. Roy

[57]  ABSTRACT

The present invention is directed to a process for the preparation of an aqueous polyurea dispersion by
  a) dispersing in water at an NCO:NH equivalent ratio of 0.5:1.0 to 2.0:1.0
    i) a polyisocyanate which has an average functionality of 1.5 to 4.0 and an isocyanate content of at least 12% by weight and
    ii) a polyamine having at least two primary and/or secondary amino groups and a molecular weight of at least at an NCO:OH equivalent ratio of 0.5:1.0 to 2.0:1.01000 and
  b) allowing the polyisocyanate and polyamine to react to form an aqueous polyurea dispersion.

The present invention is also directed to the aqueous polyurea dispersion prepared by this process.

16 Claims, No Drawings

AQUEOUS POLYUREA DISPERSIONS PREPARED BY AN EMULSION POLYMERIZATION PROCESS

BACKGROUND OF THE INVENTION

1. Field of the Invention

The present invention is directed to a process for the preparation of aqueous polyurea dispersions by the emulsion polymerization process and to the aqueous polyurea dispersions prepared by this process.

2. Description of the Prior Art

Aqueous polyurethane dispersions are known and are generally prepared by reacting a polyisocyanate with a high molecular weight polyol and low molecular weight chain extender components including components which provide hydrophilicity to the polyurethane. Generally, the polyisocyanate is initially reacted with the high molecular weight polyol to form an NCO prepolymer either in the melt or in the presence of an organic solvent prior to the introduction of water.

In U.S. Pat. No. 3,479,310 the NCO prepolymer is also chain extended to form the linear polyurethane which is then mixed with an organic solvent prior to the addition of water. In U.S. Pat. Nos. 4,066,591 and 4,408,008 the NCO prepolymers are mixed with a solvent, dispersed in water and then chain extended with low molecular weight polyamines.

Accordingly, even though the chain extension step may be conducted in either the organic or the aqueous phase, the reaction between the polyisocyanate and the high molecular weight polyol is not conducted in the presence of water in either process. Further, in both processes organic solvents are necessary to reduce the viscosity of the fully reacted polyurethane or the NCO prepolymer prior to dispersing them in water.

An object of the present invention is to provide a method for preparing aqueous polymer dispersions which does not require the use of organic solvents to reduce the viscosity of fully reacted polyurethanes or NCO prepolymers and which may be conducted using readily available, simple mixing equipment.

Surprisingly, this object may be achieved in accordance with the present invention by reacting polyisocyanates with high molecular weight polyamines by the emulsion polymerization process.

SUMMARY OF THE INVENTION

The present invention is directed to a process for the preparation of an aqueous polyurea dispersion by
a) dispersing in water at an NCO:NH equivalent ratio of 0.5:1.0 to 2.0:1.0
  i) a polyisocyanate which has an average functionality of 1.5 to 4.0 and an isocyanate content of at least 12% by weight and
  ii) a polyamine having at least two primary and/or secondary amino groups and a molecular weight of at least 1000 and
b) allowing the polyisocyanate and polyamine to react to form an aqueous polyurea dispersion.

The present invention is also directed to the aqueous polyurea dispersion prepared by this process.

DETAILED DESCRIPTION OF THE INVENTION

In accordance with the present invention a "polyurea" is understood to mean a polymer containing urea groups and optionally urethane groups.

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water in the absence of large quantities of organic solvents, even if they are hydrophilically modified.

Examples of suitable monomeric polyisocyanates include 1,6-hexamethylene diisocyanate, 1,12-dodecane diisocyanate, cyclobutane-1,3-diisocyanate, cyclohexane-1,3-and/or -1,4-diisocyanate, 1-isocyanato-3,3,5-trimethyl-5-isocyanatomethyl cyclohexane (isophorone diisocyanate), 2,4-and/or 2,6-hexahydrotoluylene diisocyanate, hexahydro -1,3-and/or -1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenylmethane-2,4'- and/or -4,4'-diisocyanate, napthalene-1,5-diisocyanate, triphenylmethane-4,4',4"-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, urethane groups or biuret groups, especially those based on 2,4- and/or 2,6-toluylene diisocyanate ("TDI"), 1,6-hexamethylene diisocyanate, isophorone diisocyanate and mixtures thereof.

The polyisocyanates or polyisocyanate adducts used to prepare the aqueous dispersions of the present invention may be used in their unmodified, hydrophobic form or they may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formulae

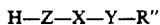

or

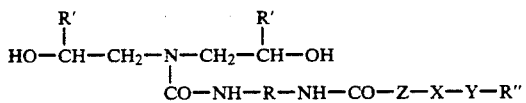

wherein

R represents a difunctional radical obtained by removing the isocyanate groups from a diisocyanate corresponding to those previously set forth, R' represents hydrogen or a monovalent hydrocarbon radical containing from 1 to 8 carbon atoms, preferably hydrogen or a methyl group, R" represents a monovalent hydrocarbon radical having from 1 to 12 carbon atoms, preferably an unsubstituted alkyl radical having from 1 to 4 carbon atoms, X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units, Y represents oxygen or —NR'''—wherein R''' has the same definition as R" and Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosures of which are herein incorporated by reference.

In addition to the previously discussed hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers, for example, those disclosed in British Patents 1,414,930, 1,432,112 and 1,428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water have a functionality of 1.5 to 4.0, preferably 1.8 to 3.0. When dispersion stability is a specific requirement, the polyisocyanates preferably have a functionality of 1.5 to 2.5, more preferably 1.8 to 2.2. These modified polyisocyanates may be obtained by reacting polyisocyanates with monofunctional compounds, optionally containing hydrophilic groups, to obtain polyisocyanates having functionalities within these ranges. The reaction of the polyisocyanates with monofunctional compounds containing hydrophilic groups improves the stability of the aqueous polyurea dispersions but can limit their molecular weight, especially when the functionality is reduced below 2. It is also possible to reduce the functionalities of polyisocyanates by reacting them with monofunctional compounds which do not contain hydrophilic groups (such as low molecular weight monoalcohols).

When dispersion stability is not critical, the polyisocyanates to be dispersed in water preferably have a functionality of at least 2, more preferably at least 2.2. These compounds may also be prepared by reacting polyisocyanates having functionalities of greater than 2 with monofunctional compounds, optionally containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred when dispersion stablity is not critical since this reduces the functionality to less than 2, thereby limiting the molecular weight of the aqueous polyurea dispersions.

In accordance with the present invention it is possible to obtain dispersion stability and to ensure that the aqueous polyurea dispersions achieve a sufficiently high molecular weight, by controlling the functionality of the component containing hydrophilic groups and the functionality of the polyisocyanate.

The polyisocyanate dispersions generally have a solids content of about 2 to 50, preferably about 10 to 30 weight percent.

After the polyisocyanates have been dispersed in water, they are chain extended with polyamines having two or more, preferably 2 to 4, primary and/or secondary amino groups and a molecular weight of at least 1000, preferably 1000 to 5000 and more preferably 1200 to 3000. In cases where the functionality of the polyisocyanate is greater than 2.5, it may be necessary to replace a portion of the polyamine with a monamine to improve dispersion stability. The amino groups may aliphatically-, cycloaliphatically-, araliphatically- or aromatically-bound.

Suitable polyamines include those obtained by hydrolyzing NCO prepolymers having isocyanate group contents of 0.5 to 40% by weight. Preferably, these polyamines are prepared by initially reacting a polyether containing two to four hydroxyl groups with an excess of a polyisocyanate to form an NCO prepolymer and then converting the isocyanate groups to amine groups by hydrolysis. Processes for the production of useful polyamines via isocyanate hydrolysis techniques are known and are described in U.S. Pat. Nos. 4,386,318, 4,456,730, 4,472,568, 4,501,873, 4,515,923, 4,525,534, 4,540,720, 4,578,500 and 4,565,645, European Patent 0,097,299 and German Offenlegungsschrift 3,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, and 4,931,595. In the event that a basic material is used during the hydrolysis of the amine which would act as a trimerization catalyst, and if that basic material is not removed once the hydrolysis reaction is complete, then an acidic material, such as benzoyl chloride, should be added either before or shortly after the polyamine and polyisocyanate are admixed.

Also useful are compounds prepared by reacting the corresponding polyol with a halogenated nitrobenzene compound such as o- or p-nitrochlorobenzene, or dinitrochlorobenzene, followed by the reduction of the nitro group(s) to the amine, as described in U.S. Application Ser. No. 07/183,556, filed on Apr. 19, 1988, now abandoned and in published European Patent Application 0,268,849, published Jun. 1, 1988. Also useful are the polyamines prepared by reacting a polyol with an acetoacetate and thereafter with an amine as described in U.S. Application Ser. Nos. 07/523,769 and 07/524,268 now abandoned, both filed on May 15, 1990, and U.S. Pat. No. 07/562,293, now U.S. Pat. No. 5,066,824 filed on Aug. 3, 1990.

Instead of, or, in addition to the high melecular weight amines noted above, polyoxyalkylene polyamines may be used. Such polyamines are known in the art. One method for preparing such amines is the amination of polyhydroxy polyethers (e.g., polypropylene glycols) by a reaction with ammonia in the presence of Raney nickel and hydrogen (Belgian patent 634,741). U.S. Pat. No. 3,654,370 discloses the preparation of polyoxyalkylene polyamines by the reaction of the corresponding polyol with ammonia and hydrogen in the presence of a nickel, copper, or chromium catalyst. The preparation of polyethers containing amino end groups by the hydrogenation of cyanoethylated polyoxyalkylene ethers is described in German Patent 1,193,671. Other methods of preparation of polyoxyalkylene polyamines are described in U.S. Pat. Nos. 3,155,728 and 3,236,895, and French Patent 1,551,605. Commercially available polyether polyamines are sold by Texaco under the Jeffamine tradename.

In order to prepare the aqueous polyurea dispersions according to the present invention the polyamine may be added to the water either before, during or after the polyisocyanate has been dispersed. If a hydrophobic polyamine is added to the water prior to the addition of the polyisocyanate, it may be necessary to add a small amount of an external emulsifier, i.e., up to about 10%, based on the weight of the polyamine, in order to maintain the polyamine stably dispersed during the introduction of the polyisocyanate. If the polyisocyanate is added to water prior to the addition of the polyamine or if the polyamine contains chemically incorporated hydrophilic groups, e.g., when using amines prepared from NCO prepolymers containing such hydrophilic groups, it may not be necessary to add an external emulsifier. The polyisocyanate and polyamine should not be admixed prior to being dispersed in water because they will immediately begin to react resulting in a rapid increase in viscosity before the mixture can be dispersed in water.

If the polyamine is directly added to the dispersed polyisocyanate, it is possible that the polyamine will react with the polyisocyanate before it has been dispersed throughout the mixture. This results in lumps or large particles forming in the dispersion. To avoid this problem it is preferred to mix the polyamine with water before it is mixed with the dispersed polyisocyanate (if the polyamine is hydrophobic, an external emulsifier may also be present), in order to reduce the concentration of the polyamine and enable it to be more quickly mixed with the dispersed polyisocyanate.

The amount of the polyamine is chosen to provide an equivalent ratio of amino groups to isocyanate groups of the polyisocyanate of 0.5:1.0 to 2.0:1.0, preferably 0.7:1.0 to 1.5:1.0 and more preferably 0.9:1.0 to 1.1:1.0.

In accordance with the present invention, it is also possible to incorporate additives into the aqueous polyurea dispersions. The additives may be present in the form of a solution or in the form of an emulsion or dispersion. These additives are known and include catalysts such as tertiary amines, aminosilanes having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The aqueous polyurea dispersions may be used in any of the applications previously disclosed for aqueous polyurethane or polyurethane-urea dispersions.

The invention is further illustrated but is not intended to be limited by the following examples in which all parts and percentages are by weight unless otherwise specified.

EXAMPLES

Example 1—Preparation of a modified polyisocyanate

A three liter round bottom flask equipped with a thermometer, drying tube, condenser, and stirrer was charged with 1366 grams of Crude MDI[1] and 683 grams of a monofunctional poly(oxyethylene) ether[2]. The temperature of the reaction flask was increased to 80° C. The reaction proceeded at this temperature for four hours at which time the isocyanate content was determined by titration to be 20.48% (theoretical NCO=20.68%). The prepolymer was cooled to ambient temperature and placed in dry bottles for later use.

[1] An aniline/formaldehyde condensation product containing 4,4'-diphenylmethane diisocyanate and about 50% of higher functionality homologs and having an isocyanate content of about 31.5% and a viscosity at 25° C. of 200 mPa.s.

[2] A polyether monohydric alcohol having a molecular weight of 2200 and prepared from n-butanol, ethylene oxide and propylene oxide (molar ratio of ethylene oxide to propylene oxide molar ratio—83:17).

Example 2—Preparation of a water dispersible polyisocyanate 200 grams of Crude MDI were mixed with 288 grams of the poly(ethylene oxide) ether; the components were the same as those in Example 1. The mixture was heated to 80° C. and reacted for four hours according to the procedure of Example 1. The isocyanate content following the reaction was about 12%. The prepolymer was cooled to ambient temperature and placed in dry bottles for latter use.

Example 3—Preparation of an aqueous polyurethane-urea dispersion by an emulsion polymerization process A two liter resin flask was charged with 556 grams of demineralized water at ambient temperature. To the water under agitation were added 2.9 grams of an ethoxylated nonylphenol emulsifier (MW - 1540), followed by 108.4 grams of an aliphatic amine terminated poly(oxypropylene) ether having a functionality of 2 and a molecular weight of 2000 (Jeffamine D-2000, available from Texaco). The water dispersible polyisocyanate from Example 1 (28 grams) was added to the mixture under rapid agitation. The isocyanate content of the dispersion was determined to be 0.13% two minutes after the polyisocyanate was dispersed, which indicates that all of the amino groups had reacted with isocyanate groups. The remainder of the isocyanate groups reacted with water over a period of several hours. The viscosity of the dispersion was 10 mPa.s at 25° C. The pH of the dispersion was 6.3.

Example 4—Preparation of an aqueous polyurethane-urea dispersion by an emulsion polymerization process A two liter resin flask was charged with 497 grams of demineralized water at ambient temperature. To the water under agitation were added 30 grams of the water dispersible polyisocyanate from Example 2. Immediately after dispersing the polyisocyanate a mixture of 7.8 grams of an ethoxylated nonylphenol emulsifier (MW - 1540), 118 grams of an aromatic amine-terminated poly(oxypropylene) ether having a functionality of 2 and a molecular weight of 3430, and 126 grams of demineralized water was added to the dispersion under rapid agitation. After 15 minutes the pH of the dispersion was below 7 indicating that all of the amine groups had reacted with the polyisocyanate. The remainder of the isocyanate groups reacted with the water over a one hour period. The viscosity of the dispersion was 10 mPa.s at 25° C. The pH of the dispersion was 4.0. The aromatic amine-terminated poly(oxypropylene) ether was prepared by reacting a poly(oxypropylene) glycol with chloro-nitrobenzene, followed by reduction of the nitro group to an amine.

Example 5—Preparation of an aqueous polyurethane-urea dispersion by an emulsion polymerization process A two liter resin flask was charged with 342 grams of demineralized water at ambient temperature. To the water under agitation were added 30 grams of the water-dispersible polyisocyanate from Example 2. Immediately after dispersing of polyisocyanate, a mixture of 5.3 grams of an ethoxylated nonylphenol emulsifier (MW - 1540), 69 grams of an aliphatic amine-terminated poly(oxypropylene) ether having a functionality of 3 and a molecular weight of 3000 (Jeffamine T-3000, available from Texaco) and 74 grams of water was added to the dispersion under rapid agitation. After about 15 minutes the pH of the dispersion was 7.05, indicating complete reaction of the amine groups with the polyisocyanate. The remainder of the isocyanate groups reacted with the water over a period of several hours. The final dispersion product was a viscous paste. The pH of the dispersion was 7.05.

Example 6—Preparation of an aqueous polyurethane-urea dispersion by an emulsion polymerization process A two liter resin flask was charged with 342 grams of demineralized water at ambient temperature. To the water under agitation were added 30 grams of the water-dispersible polyisocyanate from Example 2. Immediately after dispersing the polyisocyanate, a mixture of 5.3 grams of an ethoxylated nonylphenol emulsifier (MW - 1540), 69 grams of an aliphatic amino-terminated poly(oxypropylene) ether having a functionality of 2 and a molecular weight of 2000 (Jeffamine D-2000, available from Texaco) and 74 grams of water was added to the dispersion under rapid agitation. After about 15 minutes the pH of the dispersion was 7.3, indicating nearly complete reaction of the amine groups with the polyisocyanate. The remainder of the isocyanate groups reacted with the water over a period of several hours. The final dispersion product had a viscosity of 15 mPa.s @25° C. The pH of the dispersion was 6.2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an aqueous polyurea dispersion which comprises
   a) dispersing in water at an NCO:NH equivalent ratio of 0.5:1.0 to 2.0:1.0 i) a polyisocyanate which has an average functionality of 1.5 to 4.0 and an isocyanate content of at least 12% by weight and ii) a polyamine having at least two primary and/or secondary amino groups and a molecular weight of at least 1000 and b) allowing the polyisocyanate and polyamine to react to form an aqueous polyurea dispersion.

2. The process of claim 1 wherein said dispersed polyisocyanate was rendered hydrophilic by reaction with a compound containing a lateral or terminal nonionic hydrophilic group.

3. The process of claim 1 wherein said polyamine comprises an aminated polyether.

4. The process of claim 2 wherein said polyamine comprises an aminated polyether.

5. A process for the preparation of an aqueous polyurea dispersion which comprises a) dispersing in water at an NCO:NH equivalent ratio of 0.5:1.0 to 2.0:1.0 i) a polyisocyanate which has an average functionality of 1.5 to 2.5 and an isocyanate content of at least 12% by weight and ii) a polyamine having at least two primary and/or secondary amino groups and a molecular weight of at least 1000 and b) allowing the polyisocyanate and polyamine to react to form an aqueous polyurea dispersion.

6. The process of claim 5 wherein said dispersed polyisocyanate was rendered hydrophilic by reaction with a compound containing a lateral or terminal nonionic hydrophilic group.

7. The process of claim 5 wherein said polyamine comprises an aminated polyether.

8. The process of claim 6 wherein said polyamine comprises an aminated polyether.

9. An aqueous polyurea dispersion which is prepared by a process which comprises a) dispersing in water at an NCO:NH equivalent ratio of 0.5:1.0 to 2.0:1.0 i) a polyisocyanate which has an average functionality of 1.5 to 4.0 and an isocyanate content of at least 12% by weight and ii) a polyamine having at least two primary and/or secondary amino groups and a molecular weight of at least 1000 and b) allowing the polyisocyanate and polyamine to react to form an aqueous polyurea dispersion.

10. The dispersion of claim 9 wherein said dispersed polyisocyanate was rendered hydrophilic by reaction with a compound containing a lateral or terminal nonionic hydrophilic group.

11. The dispersion of claim 9 wherein said polyamine comprises an aminated polyether.

12. The dispersion of claim 10 wherein said polyamine comprises an aminated polyether.

13. An aqueous polyurea dispersion which is prepared by a process which comprises a) dispersing in water at an NCO:NH equivalent ratio of 0.5:1.0 to 2.0:1.0 i) a polyisocyanate which has an average functionality of 1.5 to 2.5 and an isocyanate content of at least 12% by weight and ii) a polyamine having at least two primary and/or secondary amino groups and a molecular weight of at least 1000 and b) allowing the polyisocyanate and polyamine to react to form an aqueous polyurea dispersion.

14. The dispersion of claim 13 wherein said dispersed polyisocyanate was rendered hydrophilic by reaction with a compound containing a lateral or terminal nonionic hydrophilic group.

15. The dispersion of claim 13 wherein said polyamine comprises an aminated polyether.

16. The dispersion of claim 14 wherein said polyamine comprises an aminated polyether.

* * * * *